United States Patent
Yee (10) Patent No.: US 10,739,600 B1
(45) Date of Patent: Aug. 11, 2020

(54) MALLEABLE FACIAL INTERFACE FOR HEAD MOUNTED DISPLAYS

(71) Applicant: Facebook Technologies, LLC, Menlo Park, CA (US)

(72) Inventor: Phillip Yee, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/600,686

(22) Filed: May 19, 2017

(51) Int. Cl.
*G09G 5/00* (2006.01)
*G02B 27/01* (2006.01)

(52) U.S. Cl.
CPC .......... *G02B 27/0176* (2013.01); *G02B 27/01* (2013.01); *G02B 27/017* (2013.01); *G02B 27/0149* (2013.01); *G02B 2027/0169* (2013.01)

(58) Field of Classification Search
CPC .. G02B 27/0176; G02B 27/01; G02B 27/017; G02B 27/0149; G02B 2027/0169; A61F 9/02; G09G 5/00; G09G 2354/00; G09G 5/36; G09G 5/14; G09G 5/377; G09G 5/10; G09G 2330/021; G09G 5/38; G09G 3/20
See application file for complete search history.

(56) References Cited

U.S. PATENT DOCUMENTS

| | | | | |
|---|---|---|---|---|
| 3,649,064 A | * | 3/1972 | Bledsoe | B60P 3/32 280/414.1 |
| 3,834,112 A | * | 9/1974 | Cara | E06B 1/02 249/205 |
| 4,989,598 A | * | 2/1991 | Berg | A61F 9/068 128/206.23 |
| D337,320 S | * | 7/1993 | Hunter | D14/372 |
| 5,739,893 A | * | 4/1998 | Karasawa | G02B 27/0176 351/158 |
| 5,880,773 A | * | 3/1999 | Suzuki | G02B 7/12 345/8 |
| 5,949,388 A | * | 9/1999 | Atsumi | G02B 27/0172 345/53 |
| 5,991,085 A | * | 11/1999 | Rallison | G02B 27/017 345/8 |
| 6,144,347 A | * | 11/2000 | Mizoguchi | G02B 27/0172 345/7 |
| 6,215,460 B1 | * | 4/2001 | Mizoguchi | G02B 27/0172 345/7 |
| 6,369,952 B1 | * | 4/2002 | Rallison | G02B 27/017 359/630 |
| 6,518,939 B1 | * | 2/2003 | Kikuchi | G06F 3/147 345/7 |
| D559,250 S | * | 1/2008 | Pombo | D14/372 |
| 8,605,008 B1 | * | 12/2013 | Prest | G02B 27/0176 345/7 |
| 9,989,998 B1 | * | 6/2018 | Yee | G06F 1/163 |

(Continued)

*Primary Examiner* — Olga V Merkoulova
(74) *Attorney, Agent, or Firm* — Fenwick & West LLP (57) ABSTRACT

A head-mounted display (HMD) is described. The HMD includes a facial interface made of resilient material that deforms to match a user's facial contour when the HMD is worn by the user. The HMD also includes a rigid body housing a display panel and open at a side facing the facial interface. A plurality of springs couple the facial interface to the rigid body and apply a resilient force pushing the facial interface away from the rigid body when the HMD is worn by the user. Furthermore, at least one fastener secures the plurality of springs to the facial interface or the rigid body.

10 Claims, 6 Drawing Sheets

(56) References Cited

U.S. PATENT DOCUMENTS

| | | | |
|---|---|---|---|
| 10,045,449 B1* | 8/2018 | Yee | H05K 5/0217 |
| 2002/0029399 A1* | 3/2002 | Hill | A61F 9/025 |
| | | | 2/13 |
| 2002/0089469 A1* | 7/2002 | Cone | G02B 27/0176 |
| | | | 345/8 |
| 2003/0047183 A1* | 3/2003 | Kiefer | A62B 9/04 |
| | | | 128/201.15 |
| 2004/0177432 A1* | 9/2004 | Wolfson | A63B 33/002 |
| | | | 2/446 |
| 2007/0044803 A1* | 3/2007 | Xue | A41D 13/1146 |
| | | | 128/206.21 |
| 2010/0157433 A1* | 6/2010 | Mukawa | G02B 27/0172 |
| | | | 359/633 |
| 2011/0213664 A1* | 9/2011 | Osterhout | G02B 27/017 |
| | | | 705/14.58 |
| 2011/0248905 A1* | 10/2011 | Chosokabe | G02B 27/017 |
| | | | 345/7 |
| 2012/0002158 A1* | 1/2012 | Jirsa | G02C 1/02 |
| | | | 351/52 |
| 2014/0157496 A1* | 6/2014 | Ginther | A61F 9/025 |
| | | | 2/439 |
| 2015/0201511 A1* | 7/2015 | Lee | G06F 1/1633 |
| | | | 361/679.55 |
| 2015/0234189 A1* | 8/2015 | Lyons | G02B 27/0172 |
| | | | 345/174 |
| 2017/0105470 A1* | 4/2017 | Eaton | A42B 3/064 |
| 2017/0255019 A1* | 9/2017 | Lyons | G02B 27/0172 |
| 2017/0307039 A1* | 10/2017 | Cozzo | F16F 1/3683 |
| 2018/0052327 A1* | 2/2018 | Kamakura | G02B 27/0172 |
| 2018/0078206 A1* | 3/2018 | Aimone | A61B 5/7203 |

\* cited by examiner

MALLEABLE FACIAL INTERFACE FOR HEAD MOUNTED DISPLAYS

BACKGROUND

The present disclosure generally relates to head-mounted displays (HMDs), and specifically to a malleable facial interface for HMDs.

Virtual reality (VR), augmented reality (AR), or mixed reality (MR) provide a simulated environment created by computer technology and presented to a user, such as through an HMD. The HMD may include a rigid body (enclosure) that has a display panel that presents visual data to a user wearing the HMD. The HMD may be attached to the user's head using various straps and other attachment mechanisms. An open side of the rigid body faces the user's face and eyes when the HMD is worn on the user's head. Typically a facial interface sits between the open side of the rigid body of the HMD and the user's face. This facial interface may be made of a semi-rigid or soft material, such as foam, and is shaped with the contour of a user's face, and in particular with the shape of the user's face at the points at which the facial interface makes contact. However, the sizes of people's heads vary greatly based on age, gender, build, and so on. A facial interface that contours to the shape of one person's face may fit uncomfortably on another person's face. Thus, an improved facial interface for HMDs is desired.

SUMMARY

Embodiments herein describe a head-mounted display (HMD) with a facial interface made of resilient material that deforms to match a user's facial contour when the HMD is worn by the user. The HMD also includes a rigid body housing a display panel and open at a side facing the facial interface. A plurality of springs couple the facial interface to the rigid body and apply a resilient force pushing the facial interface away from the rigid body. Furthermore, at least one fastener secures the plurality of springs to the facial interface or the rigid body.

BRIEF DESCRIPTION OF THE FIGURES

Figure (FIG. 1A illustrates a perspective view of an HMD with hammock springs in a resting state, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to an HMD that includes a facial interface fastened to the rigid body of the HMD and pushed against the user's face by springs. Due to the variations in size and shape of user's heads, the facial interface may not confirm to a variety of head shapes and sizes. The facial interface is coupled to spring mechanisms that allow movement and flexing of the facial interface to match the contour of a wider variety of heads. The spring mechanisms not only provide for greater movement of the facial interfaces, but are also attached to the facial interface at points along the facial interface such that the resulting contour fit against the user's head is comfortable for the user (i.e., ergonomic) and also provides a secure anchoring point for the HMD.

Hammock Spring Coupled Facial Interface

Figure 1A:
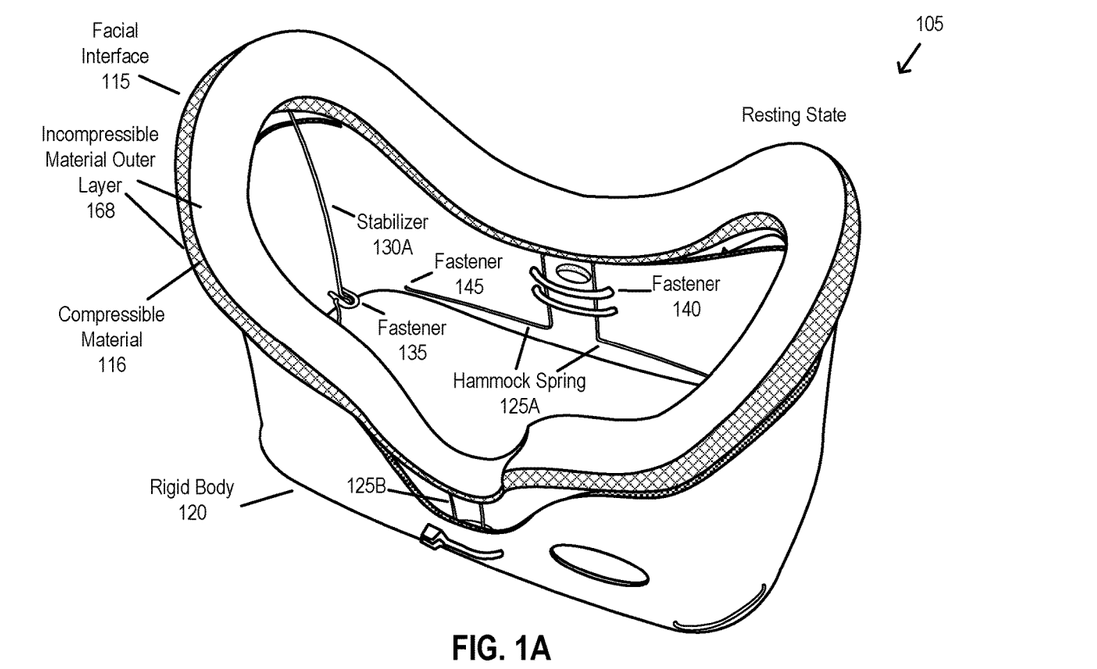

FIG. 1A illustrates a perspective view of an HMD 105 with hammock springs 125 in a rested state, according to an embodiment. The HMD 105 may include, among other components, a facial interface 115 and a rigid body 120. While the HMD 105 may include more components, such as speakers, microphone, various sensors, a strap, lenses, electronic displays, batteries, motors, structural members, and so on, these are not shown in FIG. 1 for clarity of illustration. While a particular configuration of elements is shown in FIG. 1, in other embodiments the elements may be configured differently. For example, additional hammock springs 125 may be used in another embodiment.

The facial interface 115 is a piece of deformable and resilient material that deforms to match the contours of the user's face (not shown) when it is placed against the user's face. When placed against the user's face (specifically around the eyes of the user's face), the surface of the facial interface 115 should be within a threshold distance of the user's face at all points along the facial interface.

The facial interface 115 may be made of any deformable and resilient material, such as foams (e.g., polyurethane, PVC, polymide, silicon foams, etc.), elastomers (e.g., silicon, rubber, etc.), fabrics (e.g., cotton, cellulose, nylon, rayon, synthetic, etc.), and so on. The material may also be a combination of materials. The facial interface 115 may also be made of a semi-rigid structure with physical indentations (that may be regularly spaced) in the material of the facial interface 115 that allow it to be flexible. The material may be selected so as to provide a specific indentation force deflection value that is within an ergonomic range for human use. In one embodiment, the facial interface 115 is comprised of a sandwich of materials, with an inner compressible material 116 (e.g., foam), and two outer layers of incompressible material 168 (e.g., polymer film). Such structure enables the facial interface 115 to be compressible in one direction but not in other directions, and the outer layers provide structural support and durability for the facial interface 115.

The facial interface 115 may take on a variety of different shapes. In general, the shape of the facial interface 115 is such that, when placed against the user's face, the facial interface 115 may deform to match the user's facial contours, as the facial interface 115 is placed against the user's face when the HMD 105 is worn by the user. The shape of the facial interface 115 may be modeled after the contours of an average shape of the portion of a human face surrounding the eyes. The shape of the facial interface 115 allows unobstructed viewing by the user of the images produced by an electronic display or displays housed within the rigid body 120 of the HMD 105. Thus, the facial interface 115 may have a central opening to allow for the unobstructed viewing of the images produced by the display device (not shown) of the HMD.

In one embodiment, as shown, the facial interface 115 is a strip of material that surrounds the boundary or edge of the rigid body 120 along the open face of the rigid body 120. The facial interface 115 is of sufficient width and depth to support the mass of the HMD 105 and to offer sufficient comfort for the user (e.g., 1 inch wide and ½ inch deep) by distributing the force applied the facial interface 115. The width and depth of the facial interface 115 may differ based on the material used to construct the facial interface 115. In another embodiment, the facial interface 115 is not a closed loop as shown in FIG. 1, but may be open and/or disjoint at multiple locations along its structure. In another embodiment, the width and depth of the facial interface 115 may differ at different points along the facial interface 115. This may be due to the fact that different portions of the user's face may need different levels of support from the facial interface 115. For example, the regions of the facial interface 115 that touch the user's cheeks may have more depth than other regions due to more of the mass of the HMD 105 being distributed at that location.

The facial interface 115 itself may include one or more coupling mechanisms, such as fasteners and/or hollow channels, to couple the different stabilizers 130 and springs 125 to the facial interface 115. For example, a hollow channel through the facial interface 115 allows the passage and securement of a wire, e.g., the wire for the hammock spring 125. These coupling mechanisms may provide a permanent coupling, or may provide a removable coupling to allow for the deconstruction or removal of the facial interface 115 from the stabilizers and springs, and in turn from the rigid body 120.

The rigid body 120 is made of a rigid material (e.g., plastic) and encloses various components of the HMD 105. The components are arranged in the rigid body 120 to provide the various functionality of the HMD. In particular, the rigid body 120 houses the electronic display and one or more lenses to provide images to the user when the user wears the HMD 105. The configuration of the electronic display and lenses may cause a three dimensional image to appear to the user when the user wears the HMD 105. The open side of the rigid body 120 may also be contoured according to the shape of a human face as shown. However, this may only be a rough approximation of the contours of the human face. As the rigid body 120 does not contact the user's face, its shape is not critical for the fitment of the HMD 105 against the user's face.

In one embodiment, the rigid body 120 includes various fasteners 135, 140, and 145 to fasten various spring and stabilizer mechanisms 125 and 130 to the rigid body 120. These fasteners may take the shape of loops, hooks, tie downs, etc. The fasteners are shaped to prevent or restrict any movement of the fastened spring or stabilizer mechanisms in certain directions. For example, the fastener 135 may prevent any movement of the stabilizer 130 at the coupling point between the fastener 135 and the stabilizer 130. The fastener 145 may only allow rotational movement but no translational movement of the hammock spring 125. Alternatively, the fastener 140 allows a portion of the hammock spring 125 at the region of the fastener 140 to move forward or backward but not upward or downward. The fasteners may be made of the same material as the rigid body 120, or may be made of a different material (e.g., metal).

Figure 2:
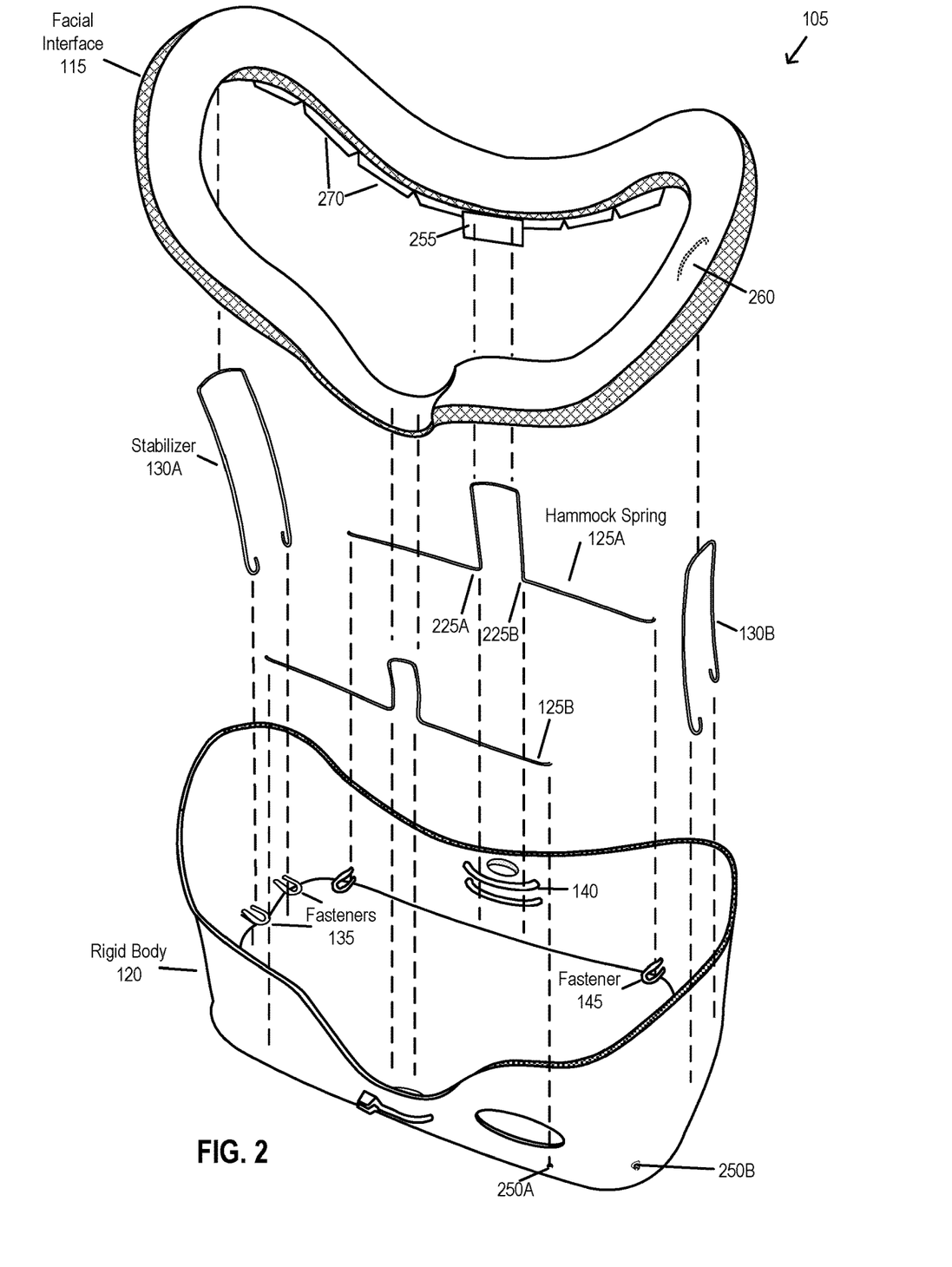
FIG. 2 illustrates an exploded view of the HMD of FIG. 1, according to an embodiment.

The hammock springs 125A, 125B (collectively referred to herein as "the hammock springs 125") support the facial interface 115 along with the stabilizers 130 and allow for the facial interface 115 to conform more closely to the contours of a wide variety of user's faces when the HMD is worn by the user. In particular, the hammock springs 125 couple the facial interface 115 to the rigid body 120 and apply a resilient force pushing the facial interface 115 away from the rigid body 120 when a depression force is placed against the facial interface 115, such as when the HMD is worn by a user. Although two hammock springs 125A and 125B are shown, in other embodiments the number of springs may be greater or fewer. Note that the hammock spring 125B is obscured in the figure by the rigid body 120. However, a description of exploded view of the same as shown in FIG. 2 is provided below to describe these hidden elements.

Each hammock spring 125 is made of a single wire. The wire is made of a material of a relatively high yield point, such that it does not deform plastically when compressed or bent under the forces applied during normal use. For example, the wire may be made of low carbon steel or plastic materials. Each endpoint of the wire is coupled to a fastener on the interior side of one of the longer sides of rigid body 120. From one endpoint, the wire follows a substantially parallel path with the rigid body 120 until it is within a certain distance of a midpoint of the rigid body 120. At this point, the wire is bent towards the facial interface 115.

After meeting the facial interface 115, the wire bends (approx. 90 degrees) to become parallel with the structure of the facial interface 115 at the point of the bend. The wire may be fastened at this point to the facial interface 115. The wire is bent once again (e.g., by approx. 90 degree) after a certain distance such that it now approaches the rigid body 120. The remaining portion of the wire mirrors the first portion (as shown), and so the wire is symmetric about a central axis of the HMD that passes through the facial interface 115 and the rigid body 120. Upon reaching the rigid body 120, the wire is bent once again to become substantially parallel with the edge of the rigid body 120, and is fastened to the rigid body 120 after a distance.

Figure 1B:
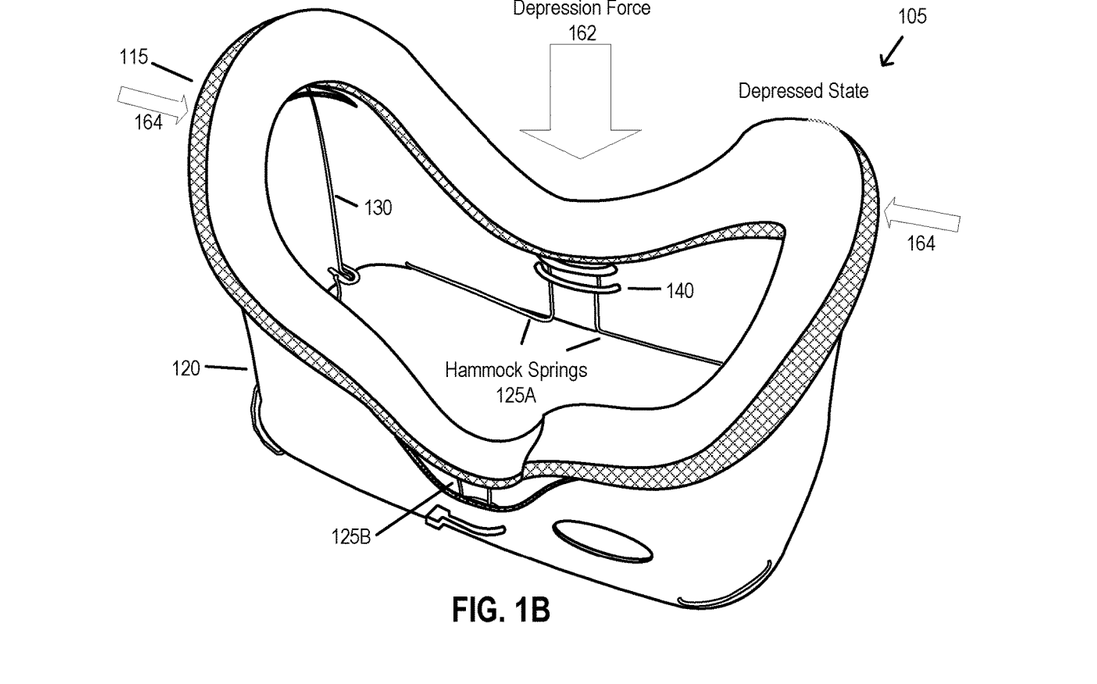
FIG. 1B illustrates a perspective view of the HMD with the hammock springs of FIG. 1A in a depressed state, according to an embodiment.

The spring functionality of the hammock spring 125 comes from the two bends in the wire that are nearest to the two endpoints of the hammock spring 125 as fastened to the rigid body 120. As shown in the top down view 105 of FIG. 1B, when the facial interface is depressed with a depression force 162, the bends in the wire elastically deform, which causes the wire to provide a spring force pushing back the facial interface 115 against the depressing force. This in turn generates a resistive force at the facial interface 115 against the depression force 162. Note that the depression force causes the hammock springs 125 to enter a compressed state, as shown in FIG. 1B. Note that the edge of the compressed hammock springs 125 in FIG. 1B is closer to the bottom (or front) of the rigid body 120 relative to FIG. 1A due to the compression.

The movement of the hammock springs 125 may be restricted by the fastener 140. The fastener 140 allows movement of the portion of the hammock springs 140 underneath the fastener 140 to move only in a forward or backward direction of the HMD. This prevents the facial interface 115 from shifting transversally along the rigid body 120, resulting in an inaccurate alignment between the rigid body 120 and the facial interface 115.

The stabilizers 130 stabilize the two shorter sides of the facial interface 115 by restricting the movement of these two shorter sides of the facial interface 115 in a forward or backward direction but preventing transverse movement orthogonal to the forward or backward direction of the HMD. Only the stabilizer 130A is shown in both FIGS. 1A and 1B. However, the stabilizer 130B is present on the opposite side of the stabilizer 130A. Stabilizer 130B is shown and described below with reference to an exploded view in FIG. 2. Although two stabilizers 130 are described here, in other embodiments the HMD may include a greater or fewer number of stabilizers 130.

Each stabilizer 130 may be comprised of a wire that has two terminating endpoints both at the rigid body 120 at fasteners 135. The wire extends from the rigid body 120 to the facial interface 115, where it loops back down to the rigid body 120. The wire may be fastened to the facial interface 115 using adhesive, another fastener, and/or may be embedded inside a channel within the facial interface 115 material.

When the depression force 162 is applied to the facial interface 115, due to the restriction on movement placed on the facial structure 115 by the stabilizers 130, the two shorter sides of the facial interface 115 move inwards, contracting the facial interface 115 in the directions 164 as shown in FIG. 1B. Thus, this allows the sides of the facial interface 115 to more comfortably mold along the contours of a user's face. As the user places the HMD on his or her head, the user's head exerts a depression force 162 against the facial interface 115, which in turn causes the sides of the facial interface 115 to contract in the direction 164, due to the stabilizers 130. This causes the facial interface 115 to wrap around the user's head and face, regardless of the shape and size of the user's head.

FIG. 2 is an exploded view 205 of the HMD 105 of FIG. 1, according to an embodiment. As shown in FIG. 2, the HMD 105 includes two hammock springs 125A and 125B at its upper side and its lower side, respectively. As described above with reference to FIG. 1, each hammock spring 125 includes two bends in the wire to provide the spring action, as indicated by 225A and 225B. The hammock spring 125A may be attached to the facial interface 115 by a fastener 225. The fastener 225 may include two openings for the wire of the hammock spring 125 to pass through, such that the portion of the hammock spring 125A parallel to the fastener 225 is one side of the fastener and the remainder of the hammock spring passes through the other side of the fastener 225. The hammock spring 125B may be attached in the same fashion to a separate fastener of the facial interface 115.

At the rigid body 120, as noted previously, hammock spring 125A passes through the fasteners 140, and are attached to the rigid body 120 with the fasteners 145. In one embodiment, the fasteners 145 are loops, hooks, or other anchoring assembly that anchors the hammock spring 125A to the rigid body 120. A similar structure may be used to anchor hammock assembly 125B to the rigid body 120. An end of the hammock spring 125B passes through a hole 250A in the rigid body 120, wraps around the outside of the rigid body 120 and then passes through a hole 250B to secure the end of the hammock spring 120B to the rigid body 120. The other end of the hammock spring 125B may also be secured to the rigid body 120 using a similar fastening mechanism.

FIG. 2 more clearly shows that each stabilizer 130 is a single wire which has two endpoints coupled to the fasteners 135 on the rigid body 120, and with the stabilizer looping up to the facial interface 115 as shown. At the facial interface, each stabilizer 130 may enter pass through a passage 260 within the facial interface 115 to secure the stabilizer 130 to the facial interface 115, or may be attached to a fastener in a manner similar to what was described above with the fastener 255 and the hammock springs 125.

In one embodiment, the facial interface 115 also includes a rigid structure. This rigid structure may be represented by the fins 270 as shown in FIG. 2. These fins 270 may be made out of a rigid material, such as a plastic polymer, and may provide additional structural support for the facial interface 115. As shown, each one of the fins 270 are not directly connected with adjacent or neighboring fins 270. Instead, gaps exist between the fins 270, and this allows the facial interface 115 to retain a certain degree of flexibility, as the facial interface 115 can exhibit flexibility at the points along which these gaps exist.

Leaf Springs Coupled Facial Interface

Figure 3:
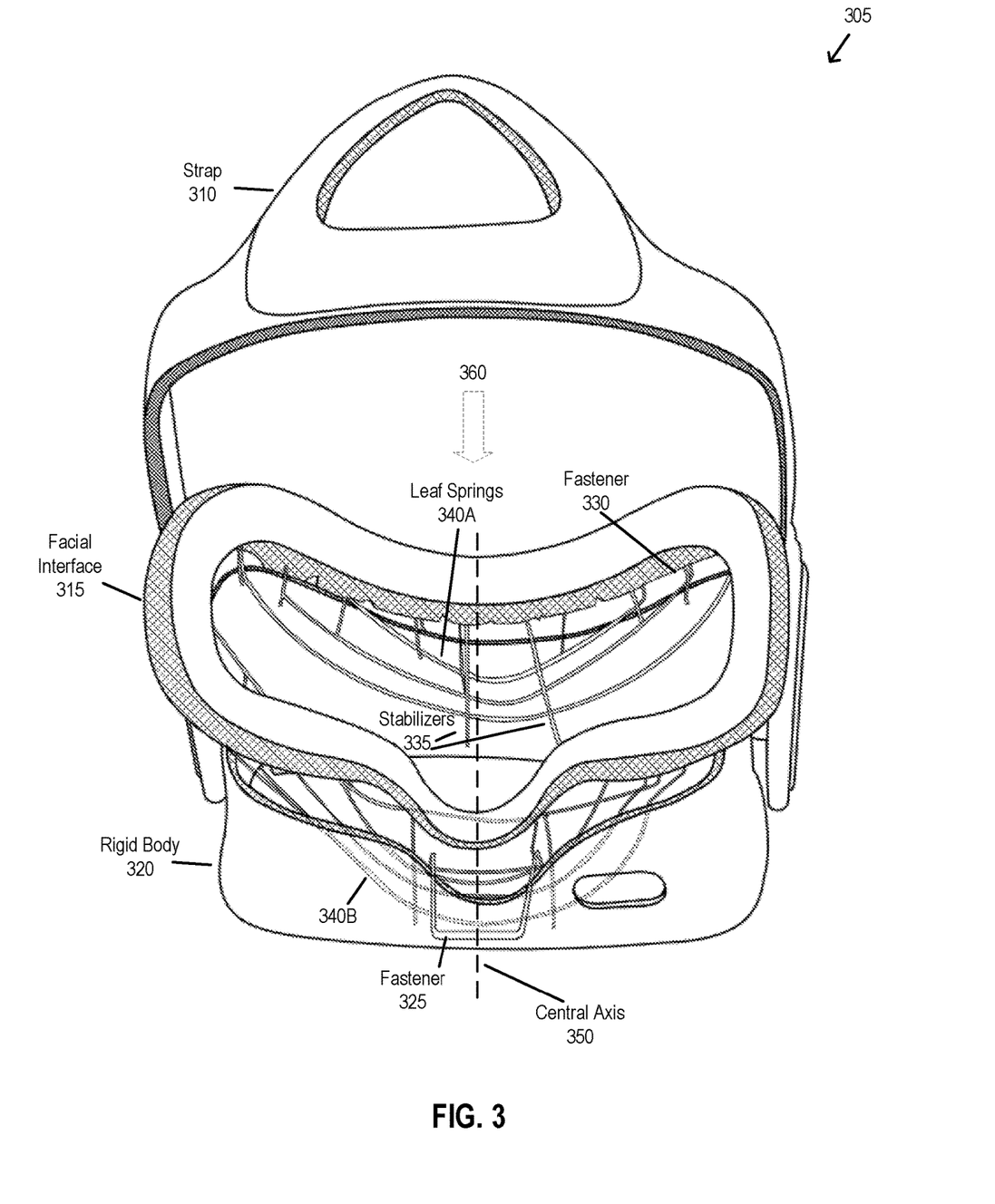
FIG. 3 illustrates a perspective view of an HMD with leaf springs, according to an embodiment.

FIG. 3 illustrates a perspective view of a HMD 305, according to an embodiment.

The HMD 305 may include, among other components, a facial interface 315, strap 310, and rigid body 320 with leaf springs 340. While the HMD 305 may include more components (such as those described in the description above with regards to FIG. 1), these are not shown here for clarity of illustration. While a particular configuration of elements is shown in FIG. 3, in other embodiments the elements may be configured differently.

The strap 310 is an assembly that can be used to place the HMD on a user's head to secure the HMD to the user's head. The strap 310 may be made of rigid or semi-rigid materials (e.g., plastic, metal, fabric, polymers, etc.) and may be adjustable to accommodate for different head sizes. The strap 310 is attached to the left and right sides of the rigid body 320 in the manner shown in FIG. 3, using various mechanisms.

The facial interface 315 is similar to the facial interface 115 described above with reference to FIGS. 1 and 2 except that the facial interface 315 is attached to the leaf springs 340 and thus includes different fasteners and attachment points to allow for the attachment to the leaf springs 340. The same structure of attachment (e.g., via adhesive, physical coupling, hollow channels, etc.) as with the hammock springs 125 may be used to secure the leaf springs 340.

The rigid body 320 of FIG. 3 may be similar to the rigid body 120 described above with reference to FIGS. 1 and 2, but differ in the attachment points and fasteners used to attach the leaf springs 340 to the rigid body 320.

The leaf springs 340 are springs that couple the facial interface 315 to the rigid body 320 while allowing the facial interface 315 to fit the facial contours of a wide variety of users when the HMD 305 is worn by the user. Although a set number of leaf springs 340 are illustrated here, in other embodiments fewer or more leaf springs may be used.

The leaf springs 340 may be made of a similar material to the hammock springs 125 as described above. Thus, they may comprise material that has a high yield strength that is not subject to deform plastically under normal use or stresses (e.g., wearing the HMD 305). As shown in FIG. 3, each leaf spring 340 may include one or more wires arranged concentrically, such that the wires are symmetric about a common center located at a point along a center axis of the HMD that passes through the facial interface 315 and the rigid body 320. The leaf springs 340 may be attached at each of the longer sides of the HMD 305, as shown by leaf springs 340A and 340B in FIG. 3.

Each wire in each leaf spring 340 curves in a parabolic shape from one endpoint located at one side of the facial interface 315, down to the rigid body 320, and then back up to an endpoint at the opposite side of the facial interface 315, such that the wire of the leaf spring is substantially symmetric about the center axis 350 of the HMD 305. Each wire runs along or substantially parallel to the longer side of the rigid body 320 (i.e., it may sit flush against the rigid body 320). The wires of each leaf spring 340 may be placed equidistantly from each other and such that the entire length of the long side of the facial interface 315 receives equal coverage by the wires.

If a depression force is applied to the facial interface 315, with the direction of the force indicated by the arrow 360, the wires of the leaf spring 340 resist the depressive force. In particular, when a depressive force is applied at the center of the facial interface 315, owing to the fact that the facial interface 315 does not have significant transverse elasticity, and due to the configuration of the leaf springs 340, the outside regions of the facial interface 315 (i.e., the side regions) move inwards towards the center of the HMD.

If the depressive force is from a user's head, then the outside portions of the facial interface 315 curve inwards to support the user's head and match the contours of the user's face. This is similar to the operation that results from the use of the hammock springs 125 as described above with reference to FIGS. 1A and 2B. However, the leaf springs 340 may allow some additional movement of the facial interface 315 in all three axis, rather than the stabilizer 135 used in the hammock spring assembly of FIG. 1, which may more significantly restrict the movement of the outside regions of the facial interface 315. Thus, the leaf springs 340 may allow the facial interface 315 to better match the contours of the user's face. However, this may come at the expense of a higher manufacturing cost to create and construct the curved leaf springs rather than the relatively simpler construction of the bends in the hammock springs 125.

In addition, another difference between the hammock springs 125 and the leaf springs 340 is that in the case of the leaf springs 340, a depressive force in the direction indicated by arrow 350 can be applied one or both sides of the facial interface 315 to cause the facial interface 315 to move along the axis of the depressive force. This allows for greater freedom of movement in the facial interface 315. This is in contrast to the hammock springs 125 as shown in FIG. 1, which utilize the stabilizer 130 at the sides of the facial interface 115, and thus the depressive force may only be applied to the center of the facial interface 115 to achieve any significant movement of the facial interface 115.

The fasteners 325 secure the wires of the leaf springs 340 to the rigid body 320. These fasteners are located at the midpoint of the rigid body 320, and secure the wires of the leaf springs 340 to the interior surface of the rigid body 320. The fasteners 325 may be wires or other structures that secure the leaf springs 340 such that they allow a certain degree of movement for the wires of the leaf springs 340 along the plane of the interior surface of the rigid body 320. For example, the fasteners 325 may attach each wire of a leaf spring 340 to the rigid body 320 at the midpoint of the wire. Alternatively, the fasteners 325 may enclose the wires of each leaf spring 340 (e.g., with additional wire). This allows greater movement of the wires of the leaf spring 340. In another embodiment, a combination of the above methods may be used to fasten the leaf springs 340 to the rigid body 320.

The fasteners 330 secure the wires of the leaf spring 340 to the facial interface 315. These may function similarly to the fasteners 255 as shown in FIG. 2. Alternatively, the wires may be inserted into an opening of the facial interface 315 and adhered to the facial interface using an adhesive or other physical coupling (e.g., a clamp).

The stabilizers 335 stabilize the motion of the facial interface 315 when the depressive force is applied. The stabilizers 335 may be fixedly attached to the facial interface 315 within a certain distance near to the midpoint of the facial interface 315 (e.g., using a fastener, such as those described above). In contrast, the stabilizers 335 may be movably attached to the rigid body 320 (e.g., using a fastener like the fastener 140). This allows the stabilizers 335 to move in the direction of the depressive force 350 or in its opposite direction. The depressive force 350 is applied on the facial interface 315 towards the front part of the HMD. Because there are two stabilizers 335 placed at a distance from each other, the stabilizers 335 restrict the movement of the center portion of the facial interface 315 such that the central portion of the facial interface 315 may move only in the direction of the depressive force (shown by the arrow 350) or in its opposite direction, and may not move transversally in the orthogonal direction of the depressive force. The stabilizers 335 secure the facial interface 315 and prevent it from moving too far along unwanted directions (e.g., side to side), and reduces play in the movement of the facial interface 315 to only those movements that are desired to allow the facial interface 315 to better match the contours of the user's face when the HMD 305 is worn.

Pendular Spring Coupled Facial Interface

Figure 4:
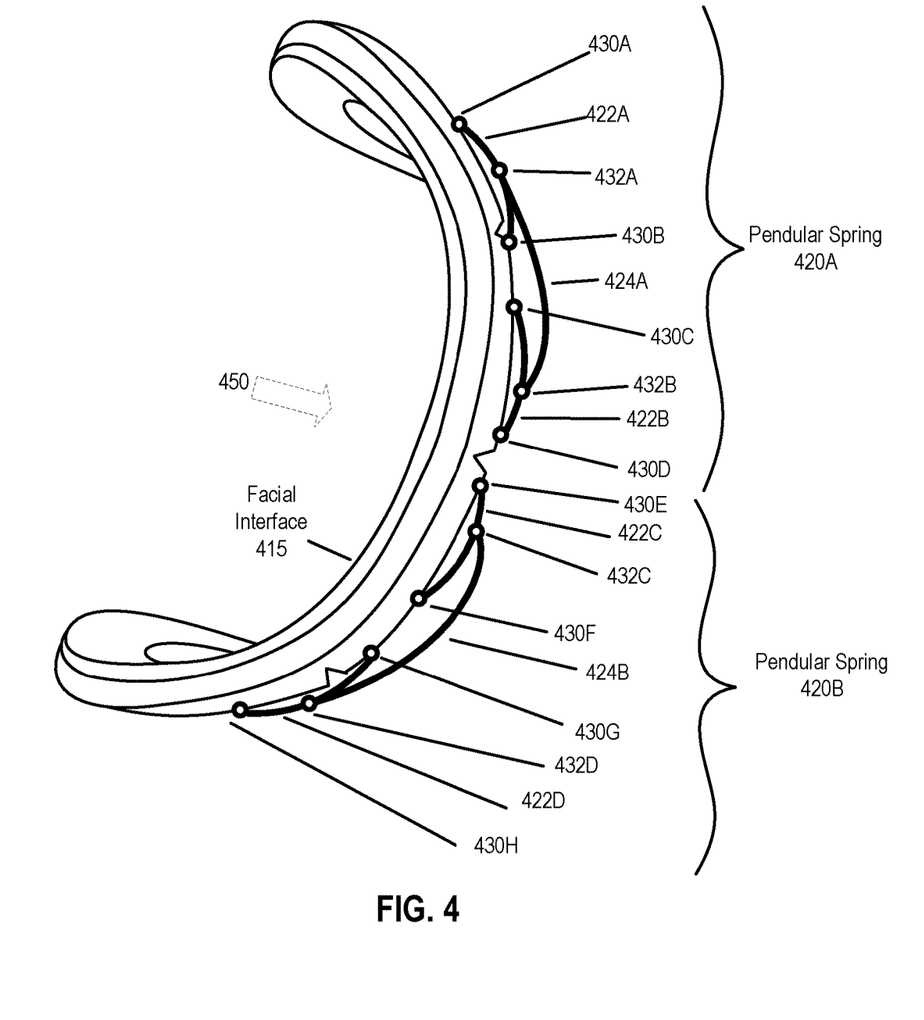
FIG. 4 illustrates a side view of a facial interface with pendular springs, according to an embodiment.

FIG. 4 illustrates a side view of a facial interface 415 with pendular springs, according to an embodiment. While the HMD may include more components (such as those described in the description above with regards to FIG. 1), these are not shown here for clarity of illustration. For example, the rigid body of the HMD is not illustrated here in order to more clearly show the pendular springs 420. As shown, there are four pendular levers 422A-D at the first layer, and two pendular levers 424A-B at the second layer. Additionally, the figure shows eight pivot joints 430A-H at the first layer and four pivot joints 432A-D at the second layer. While a particular configuration of elements is shown in FIG. 4, in other embodiments the elements may be configured differently. For example, the pendular spring 420 may include a greater or fewer number of joints 430-432 and pendular levers 422 through 424.

In contrast to the leaf springs 340 and hammock springs 125 as described above with reference to FIG. 1A through FIG. 3, the pendular springs 420 allow the face to mold to the contour of a user's face using the movement provided by the two layers of pivot joints 430 and 432 in combination with the two layers of pendular levers 422 and 424. In further contrast to the previously described springs, the pendular levers 422 and 424 are made of a rigid material, such as plastic or metal.

Each of the pendular levers 422 and 424 are in the shape of an arc or parabola, with the concavity of the shape facing against the facial interface 415. The pendular levers 422 and 424 may be spaced evenly along the facial interface 415. Each of the pendular levers 422 of the first layer are fastened to the facial interface 415 with two pivot joints 430 each. Each pivot joint 430 is at the endpoint of one of the levers 422. Two pendular levers 422 may share a pivot joint 430, although in the illustrated example the pivot joints 430 are not shared. At (or within a certain distance to) the midpoint of each pendular lever 422 is a pivot joint 432 which joins to an endpoint of one of the second layer of pendular levers 424. Each one of the pendular levers 424 of the second level joins to two pendular levers 422 of the first level. Although two levels of pendular levers are shown here, in other embodiments additional levels may be used.

The facial interface 415 may include two pendular springs 420A and 420B, each attached to one of the upper or lower sides of the facial interface 415. Each pendular spring 420 is attached to the rigid body at the midpoints of each of the second layer of pendular levers 424 using another set of pivot joints, or in the case where each pendular spring 420 includes more than two levels of pendular levers, the pendular spring is connected to the rigid body at the midpoint of the pendular levers of the final level of pendular levers in the pendular spring. The pivot joints of the pendular springs 420 may rotate along a single axis (which is normal to the surface of the page in the figure). Any force applied to any portion of the facial interface 415 causes a rotation in one or more of the pendular levers 422, which in turn may cause a rotation in the second level of pendular levers 424. However, while the pendular levers 422 and 424 are rotating, the attached rigid body may remain stationary.

The pendular spring 420 allows for a wide range of movement of the facial interface 415 while it is attached to the rigid body 420. In contrast to the other spring mechanisms described above with reference to FIGS. 1A through 3, the resistive force provided by the pendular springs 420 is not primarily against the depressive force (indicated by arrow 450) applied to the facial interface 415, but instead the pendular springs 420 distributes this depressive force along the entire facial interface 415, causing the facial interface 415 to bend in a more uniform manner.

In other words, the pendular springs 420 do not push back against the depressive force so much as distribute its load by rotating one or more of the pendular levers of the pendular spring 420. Such distribution of load creates a different experience for the user compared to the other spring designs, and may be preferred by certain users. In addition, due to this difference, the pendular springs 420 do not generate significant movement along the direction of the depressive force, and thus in contrast to the other spring mechanisms, the facial interface 415 can be placed closer to the rigid body. This may be advantageous when creating a more compact HMD, or if effort are to be made to reduce the gaps in the HMD through which unwanted ambient light may enter.

Figure 5A:
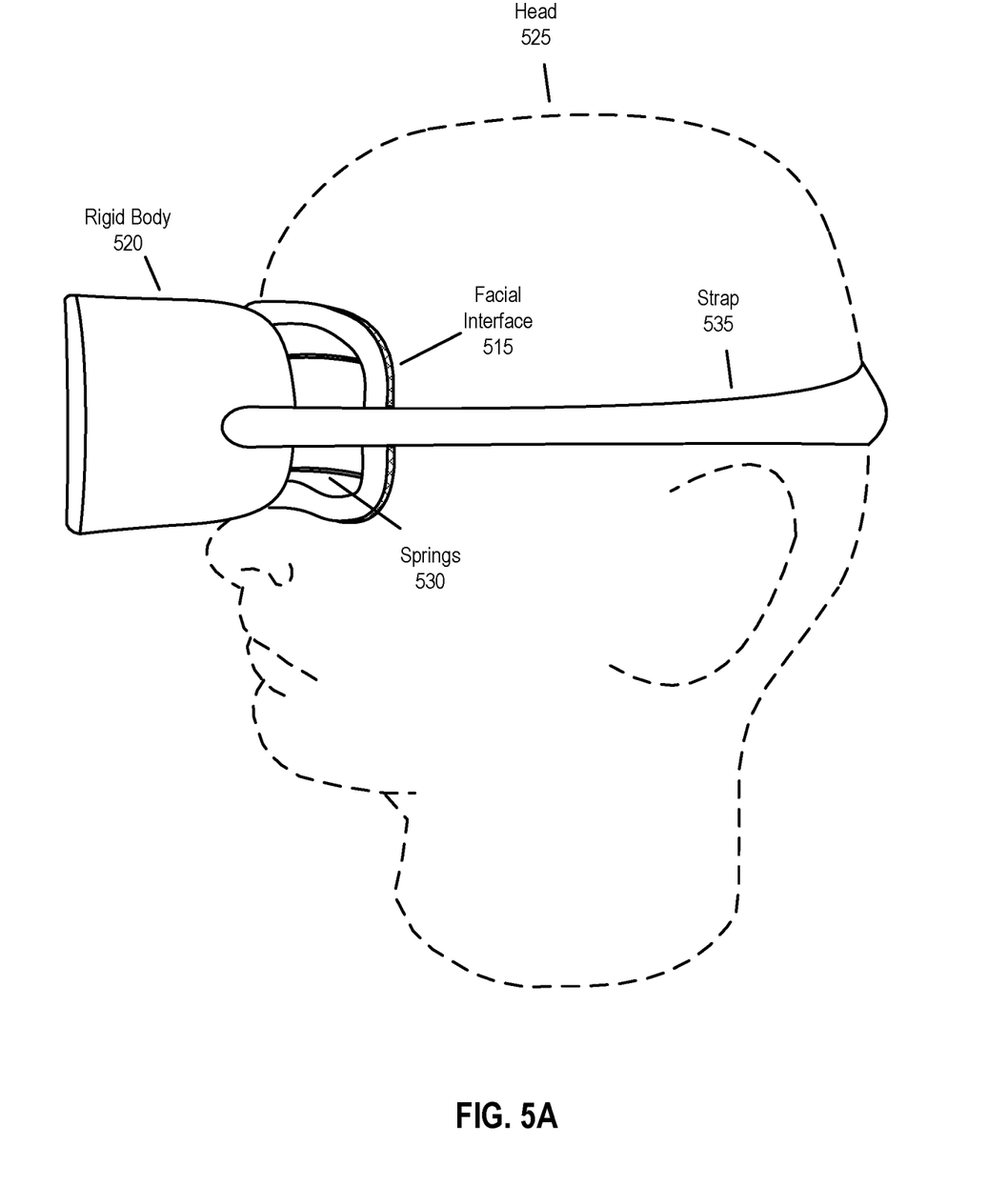
FIG. 5A illustrates an HMD with springs as worn on a user's head, according to an embodiment.

FIG. 5A illustrates an HMD with springs 530 as worn on a user's head 525, according to an embodiment. As shown in FIG. 5A, the springs 530 couple the rigid body 520 to the facial interface 515, which rests upon the user's head 525. The rigid body 520 is secured to the user's head using the strap 535, which also, by securing the rigid body 520 to the user's head 525, causes the user's head to create a depressive force against the facial interface 515. This in turn causes the springs 530 to deform and causes the facial interface 515 to match the contours of the user's facial structure, as described above. Contrast this with a facial interface which is fixed in relationship to the rigid body 520. Depending upon the shape and size of the user's head 525, such a fixed facial interface would not necessarily fit well against the contours of the user's face, causing discomfort and allowing ambient light to leak into the rigid body 520. Note that although a gap is shown between the rigid body 520 and the facial interface 515, in one embodiment this gap is covered with light blocking material, such as a black fabric, in order to prevent light from entering the rigid body 520.

Figure 5B:
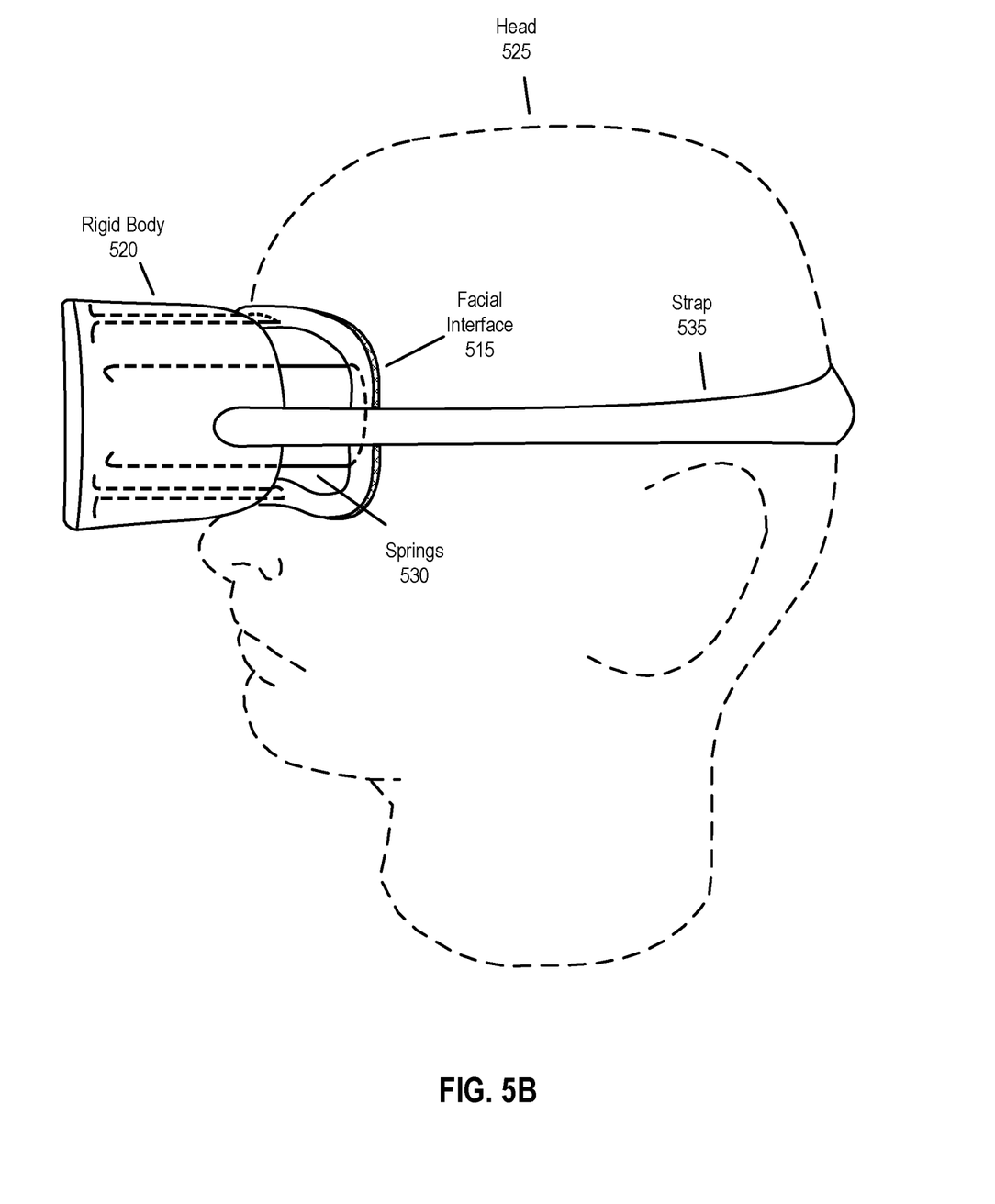
FIG. 5B shows the same HMD as in FIG. 5A, but with the hidden portions of the springs illustrated, according to an embodiment.

FIG. 5B shows the same HMD as in FIG. 5A, but with the hidden portions of the springs 530 illustrated, according to an embodiment. While here the springs 530 are hammock springs, they can be substituted for any other spring design that couples the rigid body 520 with the facial interface 515 and allows the facial interface to match the contours of the user's face. For example, the springs 530 could be substituted for the leaf springs 340 or pendular springs 420 described above.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
   a facial interface of resilient material that deforms to match a user's facial contour when the HMD is worn by the user;
   a rigid body housing a display panel and open at a side facing the facial interface, wherein the rigid body housing has at least a first set of surfaces, the first set of surfaces including two surfaces facing each other;
   a plurality of springs coupling the facial interface to the rigid body and applying resilient force pushing the facial interface away from the rigid body when the HMD is worn by the user, wherein the plurality of springs include two hammock springs each coupling an interior surface of each of the surfaces of the first set of surfaces of the rigid body to a point on a corresponding side of the facial interface, wherein each hammock spring includes at least one wire having a bend to provide an opposing force when the hammock spring is deformed, and wherein the wire is bent orthogonally at least at two different points, and wherein the wire is symmetric about an axis of the HMD passing through the center of both the facial interface and the rigid body, the plurality of springs allowing the facial interface to conform more closely to the contours of a user's faces when the HMD is worn by the user; and
   at least a fastener for securing the plurality of springs to the facial interface or the rigid body.

2. The HMD of claim 1, wherein the rigid body housing has a second set of surfaces that include two surfaces facing each other, and wherein the facial interface and rigid body are further coupled via two stabilizer wires, each stabilizer wire coupling an interior surface of the two surfaces of the second set of surfaces to a corresponding point on the facial interface, each stabilizer wire restricting movement along an axis passing through both the facial interface and rigid body.

3. The HMD of claim 1, wherein the wire is made of metal.

4. The HMD of claim 1, wherein the entire surface of the facial interface that faces the user is in contact with the surface of the user's face when the HMD is worn by the user.

5. The HMD of claim 1, wherein the facial interface has an inner compressible material sandwiched between two layers of incompressible polymer material.

6. A head-mounted display (HMD) comprising:
   a facial interface of resilient material that deforms to match a user's facial contour when the HMD is worn by the user;
   a rigid body housing a display panel and open at a side facing the facial interface wherein the rigid body housing has at least a first set of surfaces, the first set of surfaces including two surfaces facing each other;

a plurality of springs coupling the facial interface to the rigid body and applying resilient force pushing the facial interface away from the rigid body when the HMD is worn by the user, wherein the plurality of springs include two leaf springs coupling an interior surface of each of the surfaces of the first set of surfaces of the rigid body to a corresponding point on the facial interface, wherein each leaf spring comprises at least two concentrically placed parabolically shaped wires, each endpoint of each parabolically shaped wire fastened to the facial interface, and each midpoint point on each parabolically shaped wire fastened to the rigid body; and at least a fastener for securing the plurality of springs to the facial interface or the rigid body.

7. The HMD of claim 6, wherein the wires are made of metal.

8. The HMD of claim 6, wherein the rigid body housing has a second set of surfaces that include two surfaces facing each other, and wherein the HMD further comprises two sets of stabilizer wires, each set attached to an interior surface of each of the two surfaces of the second set of surfaces of the rigid body and to a corresponding point on the facial interface, and wherein each set of stabilizer wires is attached to the interior surface of each of the two surfaces of the second set of surfaces of the rigid body in a movable manner to allow for movement of the facial interface along a central axis passing through the rigid body and facial interface.

9. A head-mounted display (HMD) comprising:

a facial interface of resilient material that deforms to match a user's facial contour when the HMD is worn by the user;

a rigid body housing a display panel and open at a side facing the facial interface, wherein the rigid body housing has at least a first set of surfaces, the first set of surfaces including two surfaces facing each other;

a plurality of springs coupling the facial interface to the rigid body and applying resilient force pushing the facial interface away from the rigid body when the HMD is worn by the user, wherein the plurality of springs include two pendular springs coupling an interior surface of each of the surfaces of the first set of surfaces of the rigid body to a corresponding point on the facial interface, each pendular spring comprising at least two interconnected layers of levers, wherein the first layer of levers comprises four equally spaced rigid arc shaped levers, each of the four rigid arc shaped levers coupled with two pivot joints to the facial interface, and wherein the second layer of levers includes at least two rigid arc shaped levers, each endpoint of each of the two rigid arc shaped levers connected to a different one of the four rigid arc shaped levers; and at least a fastener for securing the plurality of springs to the facial interface or the rigid body.

10. The HMD of claim 9, wherein rigid arc shaped levers are made of a rigid plastic material.

* * * * *